(No Model.)
E. ADAM.
PROCESS OF MAKING MALT BEVERAGES.
No. 483,338.  Patented Sept. 27, 1892.
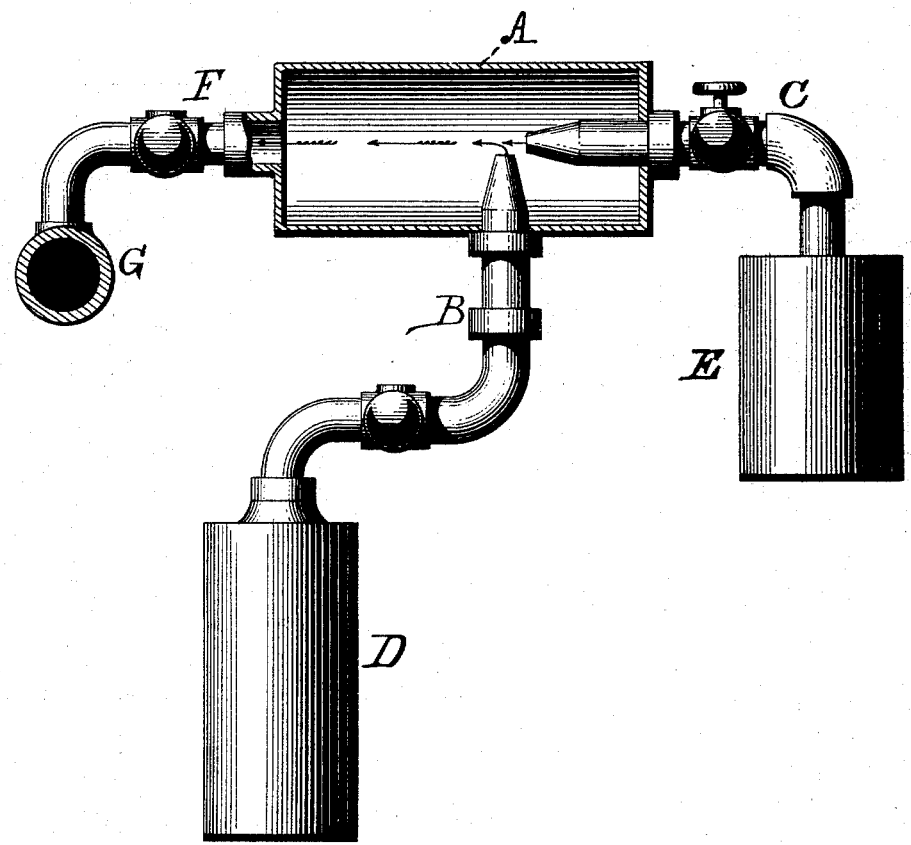
WITNESSES:
O. F. Eagle.
L. Douville.
INVENTOR
Edwin Adam
BY
ATTORNEY.

UNITED STATES PATENT OFFICE.

EDWIN ADAM, OF PHILADELPHIA, PENNSYLVANIA.

PROCESS OF MAKING MALT BEVERAGES.

SPECIFICATION forming part of Letters Patent No. 483,338, dated September 27, 1892.

Application filed December 12, 1891. Serial No. 414,829. (No specimens.)

*To all whom it may concern:*

Be it known that I, EDWIN ADAM, a citizen of the United States, residing in the city and county of Philadelphia, State of Pennsylvania, have invented a new and useful Improvement in Malt Beverages, which improvement is fully set forth in the following specification and accompanying drawing.

My invention consists of a process, as hereinafter set forth, of preparing a beverage composed of unfermented wort, charged artificially with alcohol, wine, cordial, or other distilled or fermented liquor and carbonic-acid gas.

In preparing the desired beverage a quantity of unfermented wort extracted from highly-dried malt or any suitable cereal or other material is boiled in a suitable vessel with hops, there being therein a high percentage of dextrine—say one to four per cent. of dextrine to one hundred parts of wort, according to the gravity of the wort. The boiling is continued until a desired density is obtained, when it is run off into a receiver, and from thence over or through a cooler of any suitable construction, so as to reduce the temperature to a desired degree. When this is done, it is conveyed into an air-tight vessel containing chips, where it is fined and allowed to remain a sufficient time to permit the deposit of any sediment therein, after which it is forced under air-pressure from this vessel to and through suitable apparatus containing distilled or fermented liquor, such as alcohol, wine, cordial, &c., whereby it is charged artificially with said liquor and carbonic-acid gas. It is afterward passed through a filter, when it is ready for use, and may be drawn into kegs or other desirable receptacles.

In case the wort is to be highly charged with said liquor or carbonic-acid gas it is kept constantly circulating to and from the charging apparatus and air-tight vessel until the desired charge is obtained. At any time after it is sufficiently charged the prepared wort is forced by air-pressure through a filter, and from thence into packages for the market.

In carrying out my invention I use any suitable apparatus for charging the wort, such as shown in the drawing, in which A designates a tank or vessel formed of suitable material and adapted to receive and combine the charge of alcohol which enters the same from the pipe C of the supply-tank E, and the charge of carbonic-acid gas from the pipe B of the supply-tank D, said combined alcohol and gas passing out of the tank A through the pipe F and entering the pipe G, through which flows the wort to be charged. Said pipes C, B, and F are supplied with valves, as shown, for regulating the flow through the same.

The beverage herein described as an article of manufacture forms the subject-matter of a separate application filed August 15, 1892, Serial No. 443,068, the same having been filed by me since the date of filing of the present application.

Having thus described my invention, what I claim as new, and desire to secure by Letters Patent, is—

The process of preparing a beverage, consisting in making an unfermented wort having a suitable percentage of dextrine, boiling the said wort in hops, fining the said hopped wort, and artificially charging the same with alcohol and carbonic-acid gas, substantially as described.

EDWIN ADAM.

Witnesses:
   JOHN A. WIEDERSHEIM,
   A. P. JENNINGS.